US009164912B2

(12) United States Patent
Alexander et al.

(10) Patent No.: US 9,164,912 B2
(45) Date of Patent: *Oct. 20, 2015

(54) CONFLICT RESOLUTION OF CACHE STORE AND FETCH REQUESTS

(75) Inventors: Khary J. Alexander, Poughkeepsie, NY (US); David A. Webber, Poughkeepsie, NY (US); Patrick M. West, Jr., Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/495,781

(22) Filed: Jun. 13, 2012

(65) Prior Publication Data

US 2013/0339626 A1  Dec. 19, 2013

(51) Int. Cl.
*G06F 13/00* (2006.01)
*G06F 12/08* (2006.01)
*G06F 9/38* (2006.01)

(52) U.S. Cl.
CPC .......... *G06F 12/0855* (2013.01); *G06F 9/3826* (2013.01); *G06F 9/3834* (2013.01); *G06F 9/3824* (2013.01); *G06F 9/3867* (2013.01); *G06F 12/0804* (2013.01)

(58) Field of Classification Search
CPC ..... G06F 9/3004; G06F 9/468; G06F 9/3834; G06F 13/16; G06F 13/1663; G06F 9/30087; G06F 9/3865; G06F 9/524; G06F 9/3836; G06F 9/3855; G06F 9/3857; H04L 2209/125
USPC ......... 711/150, 140, 168, 169; 710/20, 36, 39
See application file for complete search history.

(56) References Cited

U.S. PATENT DOCUMENTS

| | | | |
|---|---|---|---|
| 5,717,895 A * | 2/1998 | Leedom et al. | 711/140 |
| 5,740,398 A * | 4/1998 | Quattromani et al. | 711/117 |
| 7,865,700 B2 | 1/2011 | Luick | |
| 2002/0188817 A1 | 12/2002 | Norden et al. | |
| 2003/0163643 A1 * | 8/2003 | Riedlinger et al. | 711/131 |
| 2006/0069873 A1 | 3/2006 | Carlson | |
| 2011/0145513 A1 | 6/2011 | Iyer et al. | |
| 2011/0149661 A1 * | 6/2011 | Rajwani et al. | 365/189.11 |
| 2011/0219381 A1 * | 9/2011 | Ahn et al. | 718/104 |
| 2013/0097607 A1 * | 4/2013 | Lewis et al. | 718/102 |

(Continued)

OTHER PUBLICATIONS

U.S. Appl. No. 14/087,200; Non-final Office Action; Date Filed: Nov. 22, 2013; Date Mailed: Jun. 24, 2014, 15 pages.
U.S. Appl. No. 14/087,200; Final Office Action; Date Filed: Nov. 22, 2013, Date Mailed Dec. 11, 2014; 12 pages.

(Continued)

*Primary Examiner* — Hong Kim
(74) *Attorney, Agent, or Firm* — Cantor Colburn LLP; Margaret McNamara (57) ABSTRACT

According to an embodiment, a computer system for cache management includes a processor and a cache, the computer system configured to perform a method including receiving a first store request for a first address in the cache and receiving a first fetch request for the first address in the cache. The method also includes executing the first store request and the first fetch request, latching the first store request in a store write-back pipeline in the cache, detecting, in the processor, a conflict following execution of the first store request and the first fetch request and receiving the first store request from a recycle path including the store write-back pipeline and executing the first store request a second time.

8 Claims, 6 Drawing Sheets

(56) References Cited

U.S. PATENT DOCUMENTS

2013/0339626 A1    12/2013    Alexander et al.
2014/0082299 A1*    3/2014    Alexander et al. ............ 711/140

OTHER PUBLICATIONS

U.S. Appl. No. 14/087,200; Notice of Allowance, Date Filed: Nov. 22, 2013; Date Mailed: Mar. 4, 2015; 16 pages.

* cited by examiner

CONFLICT RESOLUTION OF CACHE STORE AND FETCH REQUESTS

BACKGROUND

The present invention relates to computer architecture and, more specifically, to scheduling and prioritizing store and fetch requests to computer memory.

For some computing system processors, an associated cache cannot execute a fetch and store request in the same cycle. As processor speeds increase, detection of a conflict of a fetch and store request becomes increasingly more difficult, as the system must know of a conflict well in advance in order to stall or delay execution of one of the requests. In one approach, a process attempts to predict the occurrence of a conflict many cycles before the attempted execution of the request. To accommodate high-frequency designs, the process for predicting conflicts can over-indicate conflicts. This inaccuracy, causes unnecessary delays of fetch and/or store requests. These postponed requests can lead to undesirable performance penalties for the computing system.

SUMMARY

According to an embodiment, a computer system for cache management includes a processor and a cache, the computer system configured to perform a method including receiving a first store request for a first address in the cache and receiving a first fetch request for the first address in the cache. The method also includes executing the first store request and the first fetch request, latching the first store request in a store write-back pipeline in the cache, detecting, in the processor, a conflict following execution of the first store request and the first fetch request and receiving the first store request from a recycle path including the store write-back pipeline and executing the first store request a second time.

An aspect relates to a method for prioritizing cache requests includes receiving a first store request for a first address in the cache and receiving a first fetch request for the first address in the cache. The method also includes executing the first store request and the first fetch request, latching the first store request in a store write-back pipeline in the cache, detecting, in the processor, a conflict following execution of the first store request and the first fetch request and receiving the first store request from a recycle path including the store write-back pipeline and executing the first store request a second time. Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In embodiments, the method, computer program product and computer system described herein reduces delay due to conflicts between store and fetch requests in a memory data cache. To enhance accuracy of conflict detection, a store recycle path is provided along with a dynamic priority switching mechanism to handle repeated store/fetch conflicts. To achieve improved conflict detection, a cache banking scheme may be utilized, where the cache is divided into banks. Accordingly a conflict occurs when the processor attempts to execute store and fetch requests for the same bank address on the same clock cycle. Due to processor and clock speed, preventing a conflict is difficult because the system must detect the conflicting requests early in order to stop execution of one of the requests. Thus, embodiments provide a recycle path in a pipeline within a processor to recycle store requests if a conflict is detected during execution. In the example, the fetch request is executed and the store request is recycled. In some cases, the recycled store or stores may encounter new conflicts during execution leading to further recycling of the store requests. If the number of recycle/conflict loops exceeds a conflict threshold, the priority for execution may switch to recycle the fetch request and allow the previously recycled store request to exit the recycle path. Embodiments reduces stalling of store and/or fetch requests and provide reduced delays or penalties by dynamically prioritizing requests. In an embodiment, the time delay caused by recycling a store request is much less than a time delay associated with recycling a fetch request. Accordingly, embodiments provide a default priority for execution of fetch requests when a store/fetch conflict occurs.

Figure 1:
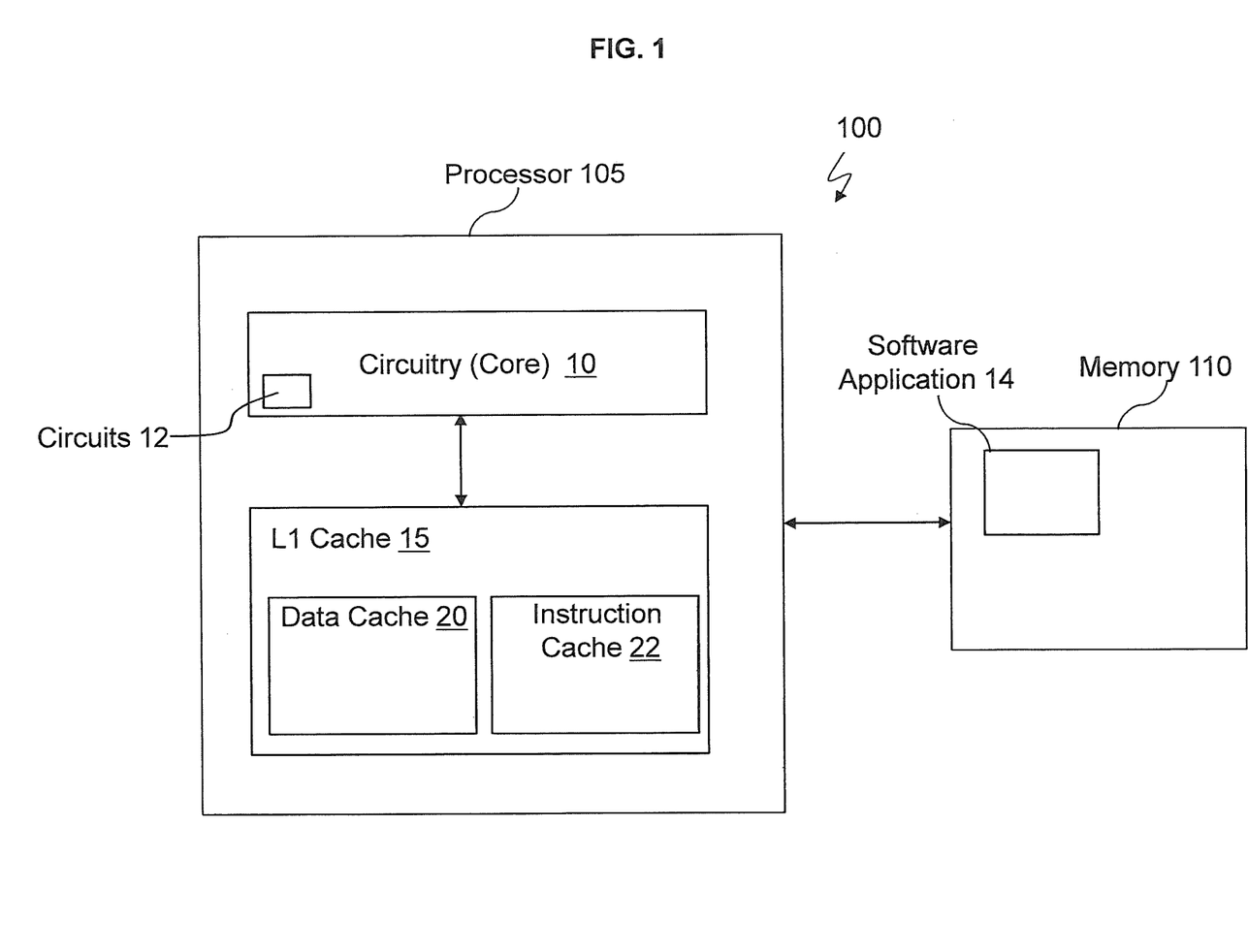
FIG. 1 illustrates a block diagram of a computing system for storing and retrieving data in a memory in accordance with an embodiment of the present invention.

Turning now to FIG. 1, a block diagram of a system 100 is generally shown according to an embodiment. The system 100 includes a processor 105. The processor 105 has one or more processor cores, and the processor core may be referred to as circuitry 10. The processor 105 may include a level one (L1) cache 15. Although an L1 cache is shown, exemplary embodiments may be implemented in any suitable cache, such as L1 cache, L2 cache and L3 cache, as desired. The L1 cache 15 includes an L1 data cache 20 (D-cache) and an L1 instruction cache 22 (I cache). The data cache 20 is on-processor (hardware) memory for caching (i.e., storing) data on the processor 105. Data retrieved from memory 110 may be cached in the data cache 20 while instructions of program code 115 retrieved from the memory 110 may be cached in the instruction cache 22 (e.g., on-processor (hardware) memory). Embodiments of the request prioritization may occur in the data cache 20 and/or instruction cache 22.

The circuits 12 may be application specific integrated circuits (ASIC), field programmable gate arrays (FPGA), etc. Also, the logic of the circuits 12 may be implemented as software code illustrated as a software application 14 in one implementation. Any reference to the functions, logic, and features for the circuits 12 applies to the software application 14 as understood by one skilled in the art. In an embodiment, improved accuracy for conflict detection and prioritization at the cache level, the cache array is divided into banks, each bank being a subset of the array. With this configuration, fetch and store requests are allowed to execute in the same cycle, provided the requests go to different banks. When both the fetch and the store request access the same bank within the cache array a conflict is indicated. In an embodiment, when the store/fetch conflict occurs, the fetch data is retrieved, but the store data is not written to the cache. Since the conflict detection is based on accesses to the cache array, only instructions which actually access the cache result in a conflict indication. This improves conflict detection as compared to predictive methods that may over-indicate conflicts, thus resulting in reduced performance and user experience.

A recycle path in a processor write-back pipeline is provided for the store requests because it is not possible to have a conflict indication early enough before execution to stall or delay the store command in the write-back pipeline. In embodiments, the conflict indication occurs after the store request has left the write-back pipeline. A mechanism is provided to retain the store request data and associated controls, so that the store request can be sent to the cache again or recycled if a conflict is indicated. Once a conflict is indicated, the main store write-back pipeline is stalled or held along with all stores in the recycle path while recycling occurs for the conflicted store in the pipeline of the recycle path. To maintain cache coherency, store requests in the write-back pipeline are retained in the order they were received. Accordingly, all store requests that pass final holding point (i.e., where requests are sent off to the cache for execution), before the conflict is known, are in the recycle path of the write-back pipeline so that they can be recycled and written in the order they were received before the hold is released.

Figure 2:
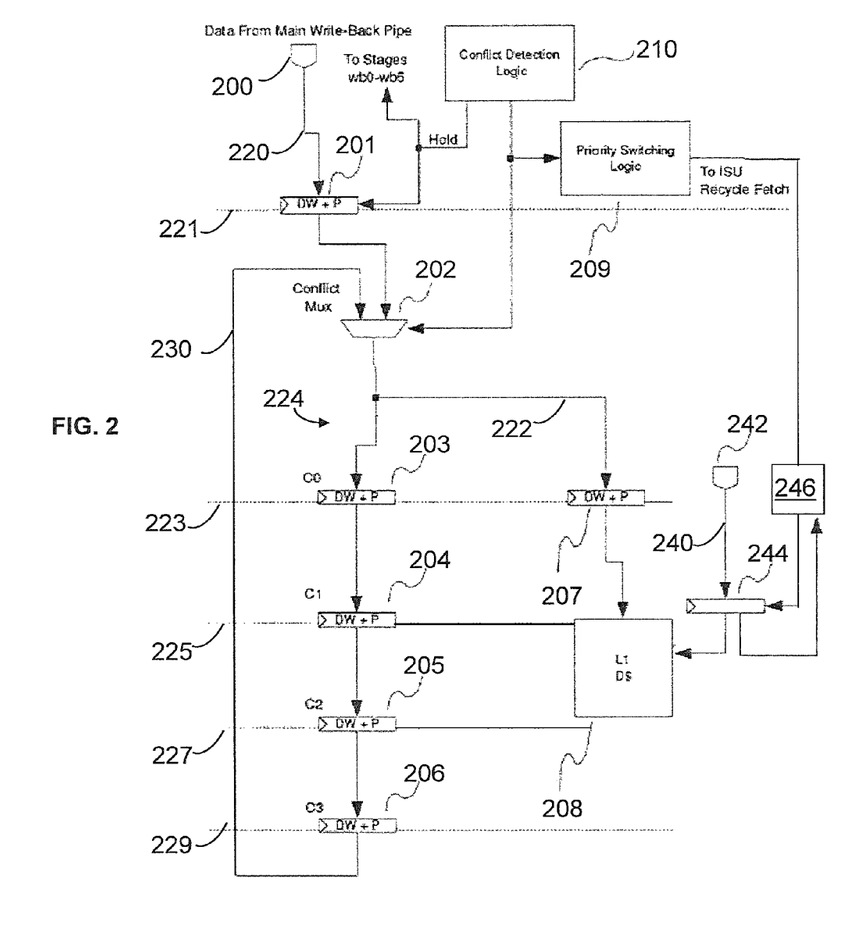
FIG. 2 illustrates a diagram of logic for prioritizing memory requests is shown in accordance with an embodiment of the present invention.

Referring now to FIG. 2, a diagram of an embodiment of a method, computer system and computer program product for prioritizing memory requests is shown. In particular, data pipelines for storage and fetch requests are illustrated along with logic and memory blocks that provide a hardware implementation of memory request prioritization. A storage or write-back pipeline 220 receives data and the store requests from a processor at a first block 200. In embodiments, the write-back pipeline 220 is located in the processor. The data and store requests are latched into a first latch 201 that corresponds to a first cycle 221. In an embodiment, the latch 201 is the last stallable stage of the write-back pipeline 220 and as such is referred to as the final holding point in the pipeline. Further, the store request cannot be held or prevented from execution beyond the latch 201, as the store request moves along to a conflict mux 202, through an execution path 222 to an execution latch 207 corresponding to a second cycle 223, following the first cycle 221. In a third cycle 225, the store request data proceeds to the cache array 208. For a conflict condition, conflict detection logic 210 compares the address bits for store and fetch requests occurring in the same cycle and provides the conflict indication as a signal. In an embodiment, the conflict indication arrives after the store request has passed the final holding point, latch 201. As depicted, the store request is not lost when it conflicts with a fetch request. Instead, the store request is preserved in a recycle path 224 because the write-back pipeline 220 is stalled upon detecting a conflict to enable a recycling of the request back to the cache.

The recycle path 224 consists of latch 203, latch 204, latch 205 and latch 206, where each latch corresponds to subsequent cycles or conflict cycles. Accordingly, latch 203 corresponds to second cycle 223, latch 204 corresponds to third cycle 225, latch 205 corresponds to fourth cycle 227 and latch 206 corresponds to fifth cycle 229. The depth of the pipeline in the recycle path 224 (number of cycles/latches) is dictated by the number of cycles that occur between the conflict indication and the last holding point (e.g., latch 201) for a processor and cache arrangement. Accordingly, the depth of the recycle path 224 may vary depending on several factors, such as processor speed, circuit area and power constraints. The pipeline in the recycle path 224 stores store requests in each of the latches corresponding to cycles through the particular cycle at which the store request in the execution path 222 is executed and the data is stored in a cache 208. In the depicted embodiment, the data is stored in the cache 208 at about cycle 225, which corresponds to store request data located in latch 204. If the store request is successful, with no conflicts with a fetch request in request pipeline 240, then the write-back pipeline 220 continues to pass along store requests. Thus, the store request from latch 204 is passed to latch 205 and the store request from latch 205 is passed to latch 206 following the execution of a successful store request.

Still referring to FIG. 2, a fetch request is received from the processor at a block 242. The fetch request is latched into a latch 244. The fetch request is then sent along to the cache 208 to fetch the data at a selected address in a bank of the cache. A conflict may occur when a fetch request in fetch pipeline 240 and a store request in write-back pipeline 220 both attempt to access the same bank in cache on the same cycle. In an embodiment, upon detecting a conflict during execution at cache 208, conflict detection logic 210 drives a hold signal to stall the main write-back pipeline at latch 201, as well as all previous write-back stages or latches. At this point, in an example, the conflicting store request is in cycle 229 and is latched in the latches 206. Latches 203, 204 and 205 may also contain valid store requests, all of which are to be recycled in the order they were received, along with the conflicted store request, before the hold on the main write-back pipeline 220 can be released. The signal from the conflict detection logic 210 to a conflict mux 202 selects for the recycled data in pipeline 230 to be executed instead of the data held in the latch 201. In one example, no further conflicts are detected and the recycled store requests are sent to the cache arrays 208 in the order the requests were received. In an embodiment, once all four store requests in latches 203, 204, 205 and 206 have been recycled, the hold signal is dropped, and a control for the conflict mux 202 switches to selecting the normal data from the main write-back pipeline 220. In one embodiment, the conflict indication and hold from logic 210 is removed for the store request in latch 206, thus allowing the store request 206 to execute in the cache. In addition, the hold is resumed and a conflict is indicated for a subsequent store request, such as the store request in latch 205, which requests moves to latch 206 during the next cycle, thus allowing a new store request to be saved in latch 203 as the requests within latches 203, 204 and 205 move along the recycle path 224. In another example, the conflicted store request may encounter a new conflict with a subsequent fetch request during the recycle attempt. In this case, the conflict detection logic 210 will extend the current state, which is the conflicted state. The hold signal is not dropped and the conflict mux 202 will continue to select the recycled data in pipeline 230 instead of the normal data from the main write-back pipeline 220. The store requests in latches 203, 204, 205 and 206 will recycle again and make another attempt to write to the cache 208.

In an embodiment, excessive recycling of store requests is prevented by a dynamic mechanism to count the repeated conflicts on the same store request, i.e. repeated conflicts without a store request exiting the write-back pipeline 220 and latches 203, 204, 205 and 206. The conflict indication signal from the conflict detection logic 210 is also sent to a priority switching logic 209. When repeated conflicts exceed a conflict threshold, the priority switching logic 209 sends a signal back to an instruction sequencing unit (ISU) 246 to recycle the fetch request instead of the store request.

Figure 3:
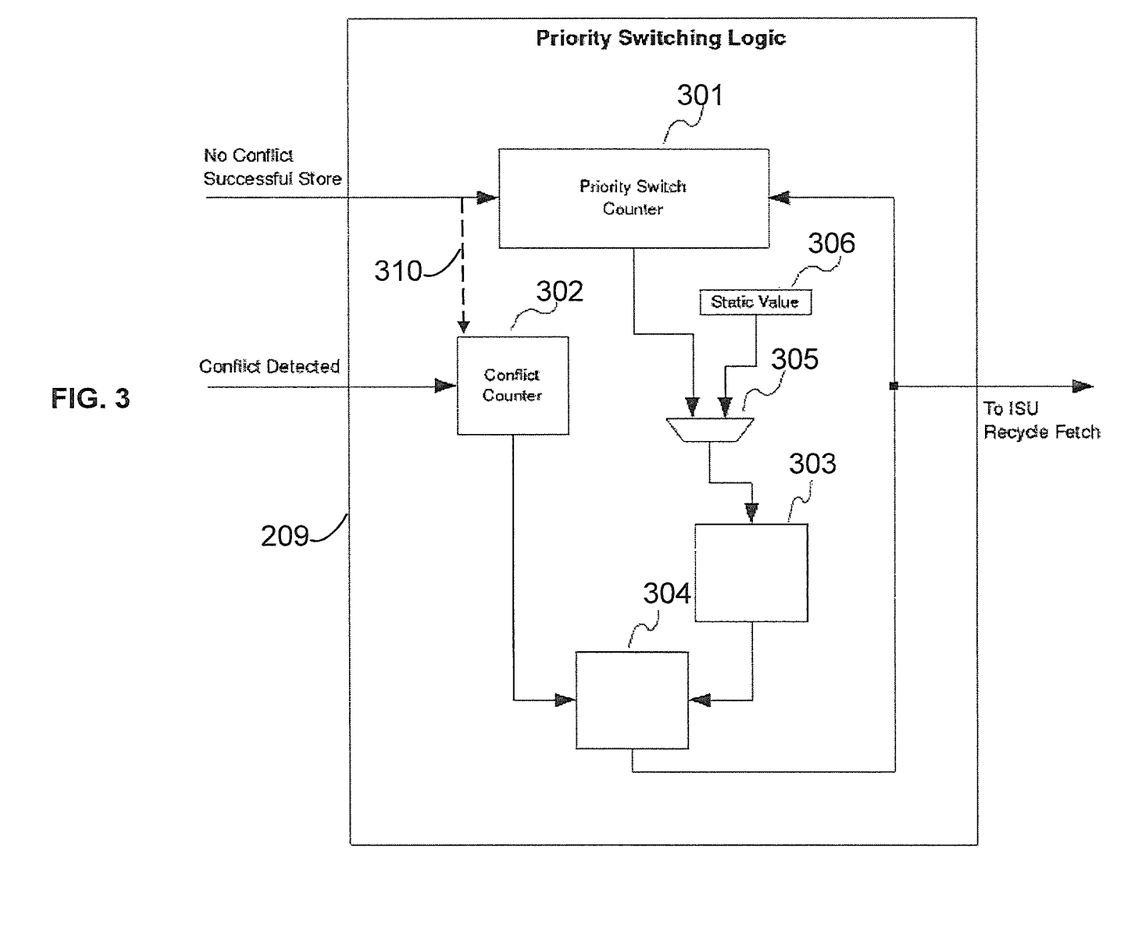
FIG. 3 illustrates a detailed diagram for the logic shown in FIG. 2, including priority switching, in accordance with an embodiment of the present invention.

FIG. 3 shows an exemplary embodiment of a diagram for the priority switching logic 209. The conflict counter 302 counts the number of conflicts a particular store request encounters. This counter is reset to zero when the store request successfully writes to the cache 208 without a conflict. In an example, when the conflict counter 302 reaches the value in a threshold register 303, a compare circuit 304 raises a recycle fetch line to cause the store request to succeed on the next attempt. In one embodiment, the recycle fetch line causes the current fetch request to be rejected and recycled back to the ISU 246. Depending on the desired embodiment, the value in the threshold register 303 may be statically or dynamically configured. A mux 305 may switch between static and dynamic threshold configuration depending on software determination, hardware logic, selected criteria and/or user input. A static configuration mechanism may be implemented to allow performance tuning of the threshold based on empirical data. In the static configuration, at system power on time, one of a plurality of values is simply scanned into a static value register 306, thus providing a predetermined threshold. Further, in embodiments, the static value register 306 is available to software at runtime, as a System Pervasive Register (SPR).

To provide dynamic configuration of the threshold register 303, a conflict counter or priority switch counter 301 may be utilized, where the counter value is compared to the threshold to determine a process for resolving conflicts. The recycle fetch signal from the compare circuit 304 is also fed to the priority switch counter 301. The counter iterates based on whether a conflict occurs. Specifically, the priority switch counter 301 decrements on fetch events that cause a store request to be recycled, and increments on successful store request events. A subset of the bits from this counter may be sent to the threshold register 303, allowing scaling, where if the lower bit or bits from the counter are discarded, a greater value from the conflict counter 302 will be required to activate the compare circuit 304. The dynamically threshold may be bounded within a predetermined range (e.g., between 1 and 10) so that there is at least one attempt to reycle the store request as compared to always rejecting fetch requests, which are typicaly a greater time penalty. Upon being equal to the threshold value (set statically or dynamically), the conflict counter 302 is reset, as shown by signal path 310.

The arrangement depicted in FIGS. 2 and 3 enable store/fetch request prioritization based on identifying conflicts after they occur, thus eliminating false conflict indications. The recycle path 224 provides latches to receive store requests in order and recycle them in the correct order upon detection of a fetch/store request conflict. By prioritizing a fetch request over a store request, delays are reduced and performance is increased. The static and dynamic switching logic prevent excessive repeated failed attempts to execute store requests. The dynamic switching logic accounts for recent trends to prevent continued rejection of store requests, thus avoiding excessive backlogs in the write-back pipeline that may be caused by repeated holds of store requests.

Figure 4:
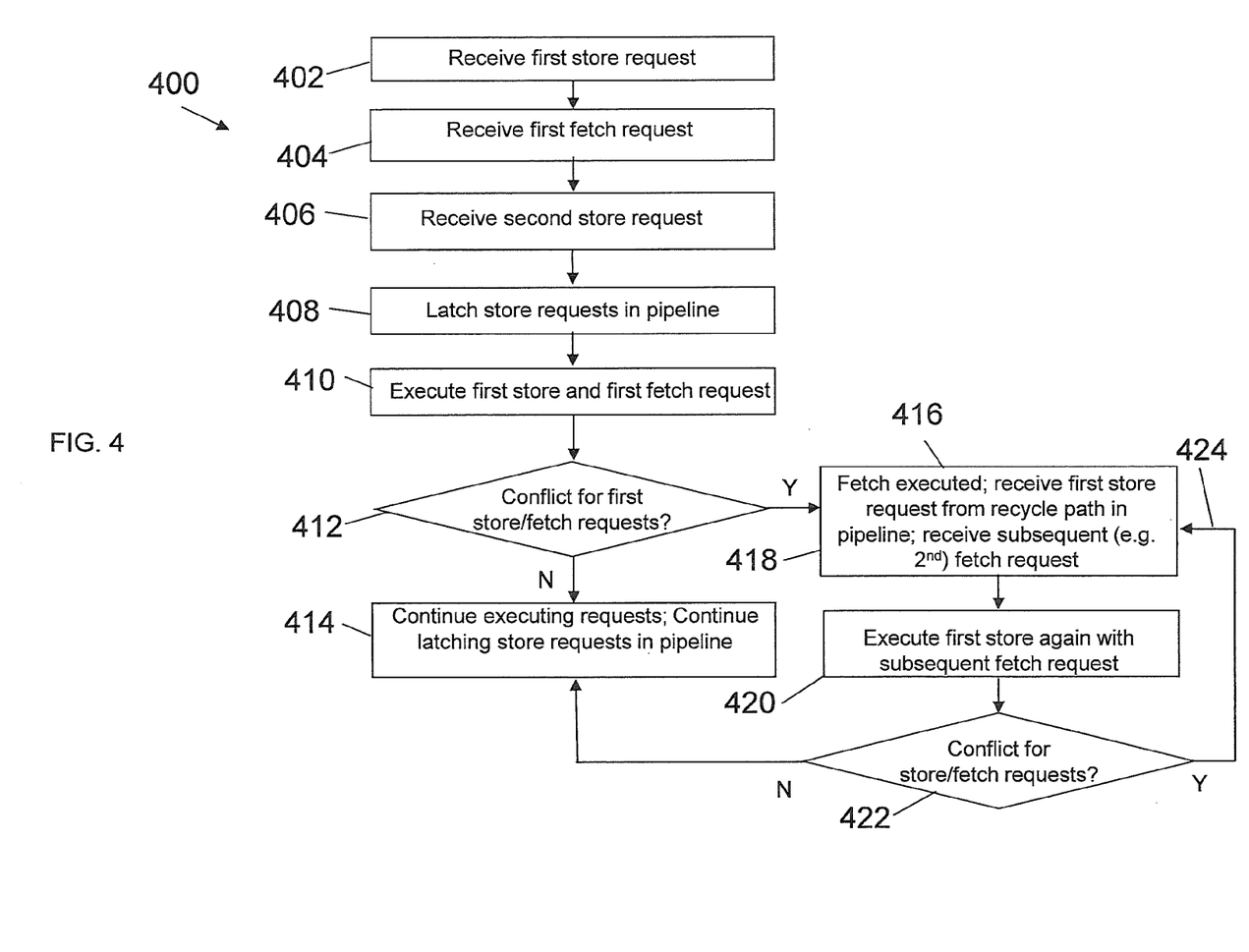
FIG. 4 illustrates a flow diagram of a method for prioritizing requests to cache memory in accordance with an embodiment of the present invention.

FIG. 4 is a flow chart of an exemplary process for prioritizing requests to memory, such as a cache ("cache memory"). The depicted blocks may be part of or in addition to another process and/or may be performed in any suitable order to provide prioritizing and processing store/fetch conflicts. In an embodiment, the actions described in the blocks are performed by a processor. In block 402, a first store request is received in a processor for a first address in a bank in a cache. In block 404, a first fetch request is received in the processor for a second address in a bank in the cache. In block 406, a second store request is received in the processor for a third address in a bank in the cache. In block 408, each of the first and second store requests are latched in latches within recycle path of a write-back pipeline. In block 410, the first store and first fetch requests are executed. In block 412, following the execution of the first store and first fetch requests, it is determined if a conflict occurred. A conflict occurs when the same bank is accessed by the fetch and store requests at the same cycle time. In block 414, if a conflict did not occur, requests continue to execute and the write-back pipeline feeds new store requests into latches in the pipeline, thus updating the pipeline while continuously executing the store requests in the cache. In block 416, if a conflict does occur, the fetch request is executed and the conflicted store request is recycled through the recycle path in the write-back pipeline, where the store requests in the pipeline are stalled or held to ensure that all store requests are executed in the order they were received. By stalling store requests after a conflict, receipt of new store requests in latches of the pipeline is also stopped. Further, a fetch subsequent to the first fetch request is received. In block 422, following the execution of the first store and second fetch requests, it is determined if a conflict occurred again. If a conflict does occur, indicated by arrow 424, the fetch request is executed and the store request is recycled through a recycle path in the write-back pipeline. If a conflict did not occur, requests continue to execute and the write-back pipeline feeds new store requests into latches in the pipeline, thus updating the pipeline, as shown in block 414.

Figure 5:
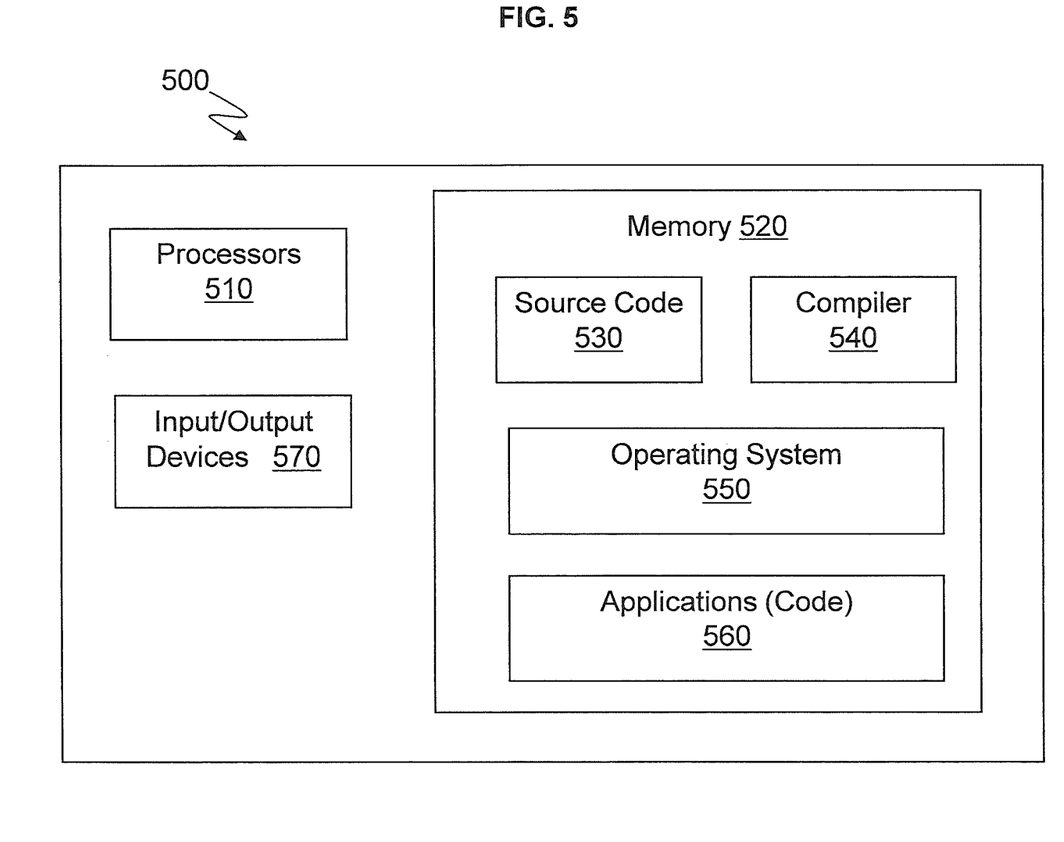
FIG. 5 illustrates an example of a computer having capabilities, which may be utilized in accordance with an embodiment of the present invention.

FIG. 5 illustrates an example of a computer 500 having capabilities, which may be included in exemplary embodiments. Various methods, procedures, modules, flow diagrams, tools, application, circuits, elements, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may be utilized to implement, to connect to, and/or to support any element discussed herein (as understood by one skilled in the art) in FIGS. 1-4 and 6.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 520 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

Figure 6:
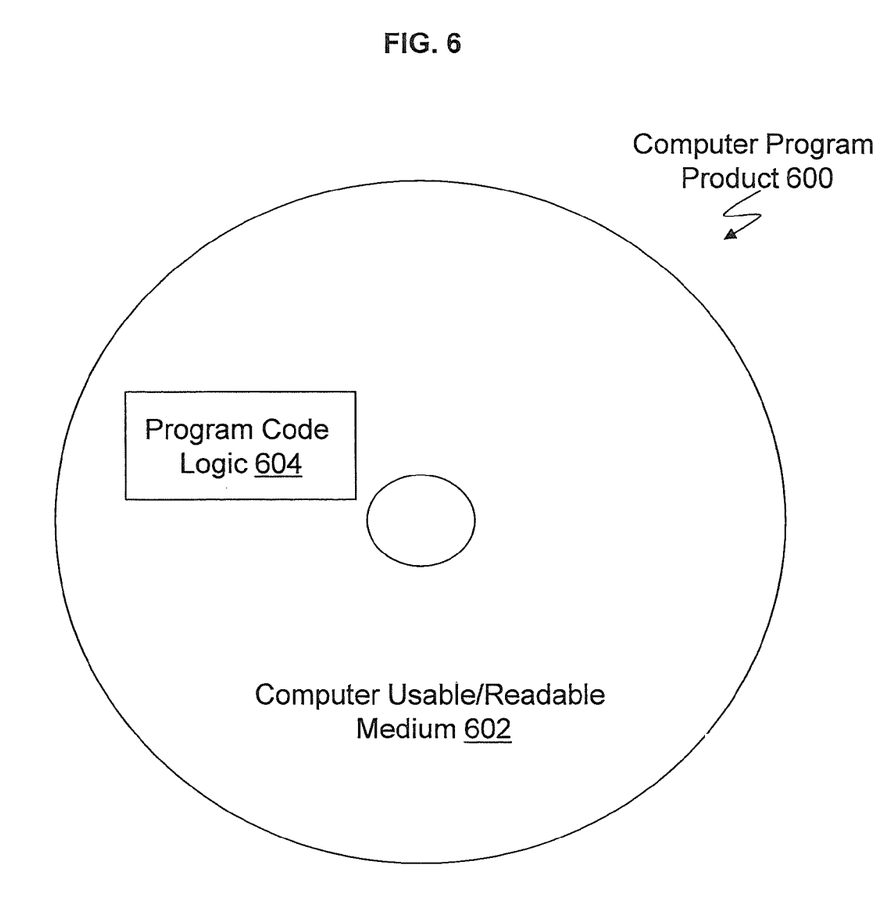
FIG. 6 illustrates an example of a computer program product on a computer readable/usable medium with computer program code logic embodied in tangible media as an article of manufacture.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a nonexhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include reduced delay due to conflicts between store and fetch requests in a memory data cache. To enhance accuracy of conflict detection, a store recycle path is provided along with a dynamic priority switching mechanism to handle repeated store/fetch conflicts.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for cache management, the system comprising:
    a processor and a cache, the computer system configured to perform a method comprising:
    receiving a first store request for a first address in the cache;
    receiving a first fetch request for the first address in the cache;
    executing the first store request and the first fetch request;
    latching the first store request in a store write-back pipeline in the cache;
    detecting, in the processor, a conflict following execution of the first store request and the first fetch request; and
    receiving the first store request from the recycle path including the store write-back pipeline and executing the first store request a second time, the receiving the first store request from the recycle path including the store write-back pipeline and executing the first store request a second time comprising:
        executing the first store request a second time along with a second fetch request;
        receiving the first store request from the store write-back pipeline a second time and executing the first store request a third time based on a conflict that occurred while executing the first store request the second time along with the second fetch request;
        iterating a conflict counter up each time a conflict occurs while executing the first store request;
        comparing a value of the conflict counter to a conflict threshold; and
        executing the first store request based on the value of the conflict counter being equal to the threshold.

2. The computer system of claim 1, wherein executing the first store request based on the value of the conflict counter being equal to the threshold comprises rejecting a subsequent fetch request to an instruction sequencing unit based on occurrence of a subsequent conflict.

3. The computer system of claim 1, wherein the method further comprises decrementing the conflict threshold for each time a conflict occurs while executing the first store request and incrementing the conflict threshold each time there is an execution of a store request without a conflict.

4. The computer system of claim 1, wherein the method further comprises resetting the conflict counter to zero based on a successful execution of a first store request.

5. The computer system of claim 1, wherein the method further comprises latching subsequent store requests in the store write-back pipeline following the first store request, wherein the first store request and subsequent store requests are executed in an order which they were received in the store write-back pipeline.

6. The computer system of claim 1, wherein executing the first store request comprises executing the first fetch request if there is a conflict between the first fetch request and first store request.

7. The computer system of claim 1, wherein executing the first store request and the first fetch request comprises executing the first store request and the first fetch request at a first cycle time, and wherein executing the first store request a second time comprises executing the first store request at the second cycle time after the first cycle time.

8. A computer system for cache management, the system comprising:
    a processor and a cache, the computer system configured to perform a method comprising:
    receiving a first store request for a first address in the cache;
    receiving a first fetch request for the first address in the cache;
    executing the first store request and the first fetch request;
    latching the first store request in a store write-back pipeline in the cache;
    detecting, in the processor, a conflict following execution of the first store request and the first fetch request;
    performing until one of a number of iterations of the performing reaches a conflict threshold and a conflict does not occur while executing the first store request:
        receiving another fetch request; and
        receiving the first store request from a recycle path including the store write-back pipeline and executing the first store request along with the other fetch request; and
    in response to the number of iterations of the performing reaching the conflict threshold, executing the first store request.

* * * * *